United States Patent [19]

Koga et al.

[11] Patent Number: 4,491,243

[45] Date of Patent: Jan. 1, 1985

[54] APPARATUS FOR DIRECTLY AND CONTINUOUSLY WEIGHING CONTINUOUSLY FED POWDER OR PARTICLE SUBSTANCES

[76] Inventors: Yoshikazu Koga, No. 920-74 Mogusa, Hino-shi, Tokyo; Hiroyuki Fukuya, 1-2-6-306 Kitamidorigaoka, Toyonaka-shi, Osaka-fu, both of Japan

[21] Appl. No.: 341,630

[22] Filed: Jan. 22, 1982

[30] Foreign Application Priority Data

Jan. 28, 1981 [JP]  Japan .................................. 56-11104
Aug. 28, 1981 [JP]  Japan .............................. 56-135883

[51] Int. Cl.³ ............................................. B67D 5/08
[52] U.S. Cl. ...................................... 222/55; 222/452
[58] Field of Search .................. 222/55, 52, 237, 236, 222/239, 452, 451, 450

[56] References Cited

U.S. PATENT DOCUMENTS

| 3,260,415 | 7/1966 | Minamiyama et al. | 222/452 |
| 3,561,643 | 2/1971 | Klouen | 222/55 |
| 4,326,651 | 4/1982 | Sabase et al. | 222/452 |

Primary Examiner—Stanley H. Tollberg
Assistant Examiner—Kenneth Noland
Attorney, Agent, or Firm—Kerkam, Stowell, Kondracki & Clarke

[57] ABSTRACT

Weighing apparatus including a plurality of vessels which are disposed vertically under a hopper with the axes thereof being aligned with one another and a weighing device provided under the lowest vessel. At least one of the vessels is provided at the top and bottom portions thereof with rotary discs having an opening.

2 Claims, 5 Drawing Figures

APPARATUS FOR DIRECTLY AND CONTINUOUSLY WEIGHING CONTINUOUSLY FED POWDER OR PARTICLE SUBSTANCES

BACKGROUND OF THE INVENTION

This invention relates to an apparatus for directly and continuously weighing continuously fed powder or particle substances in a feed line.

In producing cement, chemical substances, fertilizer and the like, powder or particle substances being fed through a feed line are commonly weighed by means of a weighing apparatus disposed in the feed line in order to obtain a constant feed of the substances. A weighing apparatus of the weight reduction type or an impact line flow meter is usually used as this sort of weighing apparatus. When the weight reduction type weighing apparatus is used for measurement of the substances, it is necessary to interrupt the measurement while the substances are being supplied into the hopper since the weight reduction type weighing apparatus is constructed to measure the weight reduction of the substances in the hopper. When the impact line flow meter is used for measurement of the substances, the impact force that is generated when the substances fall naturally on a sensing plate is measured and converted into the weight of the substances. In other words, the impact line flow meter is constructed to measure the weight of substances indirectly.

SUMMARY OF THE INVENTION

Accordingly, it is a primary object of the present invention to provide an improved weighing apparatus which is free of the abovementioned inconveniences.

Another object of the present invention is to provide an apparatus for directly and continuously weighing continuously fed powder or particle substances in a feed line.

BRIEF DESCRIPTION OF THE DRAWINGS

Other objects and advantages of the present invention will be readily appreciated as the apparatus becomes better understood by reference to the following detailed description when considered in connection with the accompanying drawings in which like numerals refer to like parts and wherein.

DETAILED DESCRIPTION OF A PREFERRED EMBODIMENT

Figure 1:
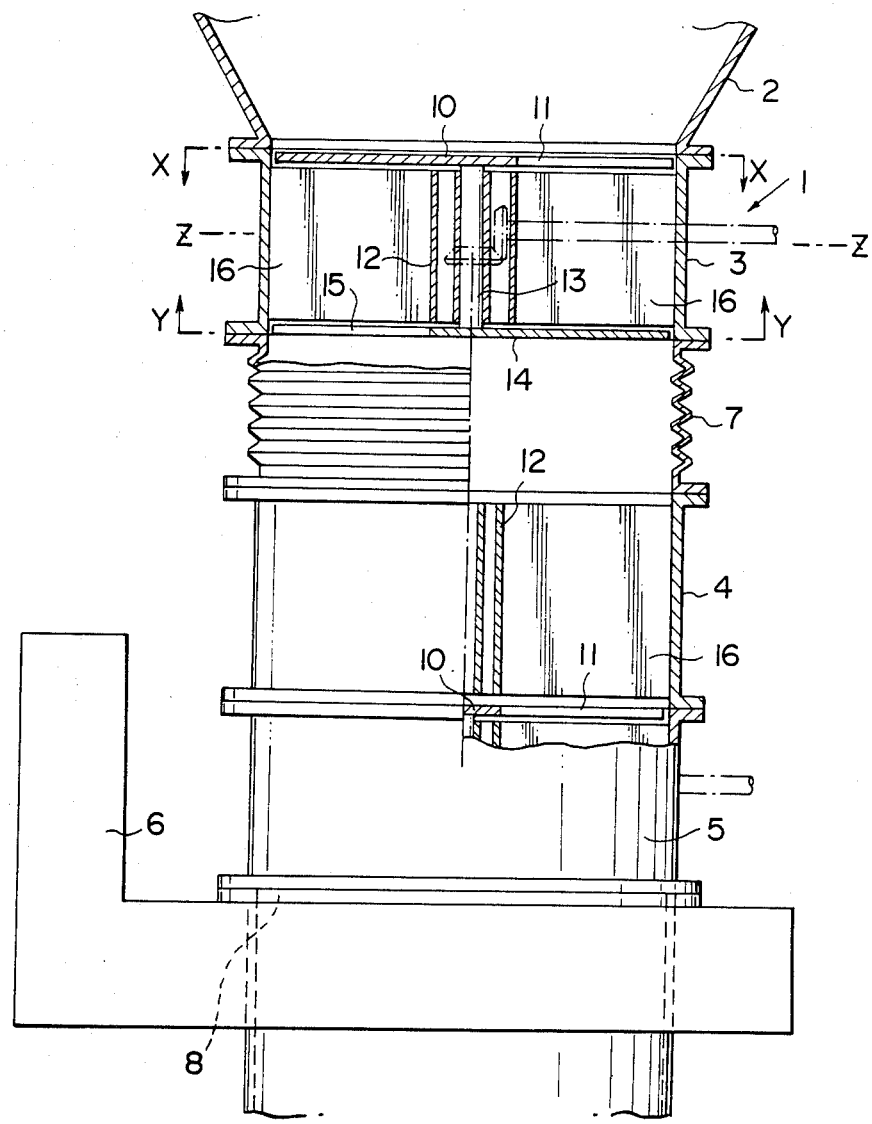
FIG. 1 is a schematic view, partly in section, of a weighing apparatus according to the first embodiment of the present invention.
Figure 5:
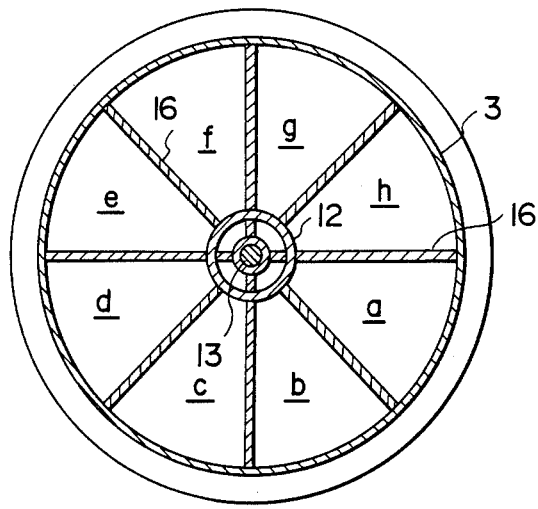

Referring to FIG. 1, there is illustrated a weighing apparatus 1 according to the first embodiment of the present invention. The weighing apparatus 1 includes three cylindrical vessels 3, 4 and 5 which are disposed vertically under a hopper 2 with the axes thereof being aligned with one another. The upper vessel 3 has substantially the same shape and construction as the lower vessel 5. The three cylindrical vessels 3, 4 and 5 are identical in diameter. In the interior of each vessel, eight compartments a, b, c, d, e, f, g and h of the same sectional area (see FIG. 5) are formed in a fan shape by the partition walls 16 fixedly connected to the peripheral wall of the vessel. The corresponding partition walls 16 and thus the compartments of three vessels are aligned with one another in the vertical direction. The vessel 4 is open at the top and the bottom thereof, while each of the vessels 3 and 5 is provided with a rotary disc 10 at the top and a rotary disc 14 at the bottom thereof. The top and bottom rotary discs 10, 10 and 14, 14 are formed with fan-shaped openings 11, 11 and 15, 15 therein, respectively, the area of which is substantially the same as the sectional area of one of the compartments. The openings 11, 11 and 15, 15 are staggered in position so as not to be positioned on the same compartment and preferably they are arranged symmetrically to the axis of the vessel. The top and bottom rotary discs 10, 10 and 14, 14 of the two vessels 3 and 5 are fixed to rotary shafts 13, 13 and are rotated at the same angular velocity through the rotary shafts 13, 13 by means of a mechanical or electrical synchronizing mechanism (not shown) so that the phases of the corresponding openings coincide with each other. There is provided a weighing means 6, e.g. a load cell or a platform weighing machine, under the lower vessel 5 and the weighing means 6 is formed with an outlet 8 for discharging the powder or particle substances which flow out through the opening 15 formed in the bottom rotary disc 14 of the lower vessel 5. The upper vessel 3 is directly secured to the lower end of the hopper 2 and a flexible hood 7 is provided between the upper vessel 3 and the vessel 4. Accordingly, the weighing means 6 can measure only the weights of the two vessels 4, 5 and the substances received therein and further can be designed to indicate only the weight of the substances in the vessels 4, 5 after deducting the weight of the vessels 4, 5.

The present weighing apparatus 1 constructed as described above operates as follows. First, the rotary shafts 13, 13 are driven by means of the synchronizing mechanism to rotate the top and bottom discs 10, 10 and 14, 14 at the same angular velocity so that the phases of the corresponding openings 11, 11 and 15, 15 coincide with each other. When the opening 11 of the upper vessel 3 is in alignment with a given compartment, e.g. the compartment a, the substances in the hopper 2 fall through the opening 11 into the compartment a. At this line, the opening 15 formed in the bottom disc 14 of the upper vessel 3 is in alignment with the compartment e and thus the substances previously received in the compartment e of the vessel 3 fall through the opening 15 into the corresponding compartment e of the vessel 4. Accordingly, when the top and bottom discs 10 and 14 of the upper disc 3 are rotated continuously in this manner, half of the eight compartments in the vessel 3 (for example, a, b, c and d) are filled with the substances, while in the vessel 4, the other compartments e, f, g and h are filled with the substances.

Now, considering the supply and the discharge of the substances into the vessel 5, the full-empty condition of the compartments in the vessel 5 is exactly same as that in the vessel 3 since the top and bottom discs 10, 10 and 14, 14 of two vessels 3 and 5 are rotated so that the phases of the corresponding openings coincide with each other. To be concrete, at the time the substances are charged from the hopper 2 into the compartment a of the vessel 3, for example, the substances previously received in the compartment e thereof flow through the opening 15 into the corresponding compartment e of the vessel 4. Then, the substances previously received in the compartment a of the vessel 4 flow through the opening 11 of the vessel 5 into the corresponding compartment a thereof and the substances previously received in the compartment e of the vessel 5 are discharged through the opening 15 thereof and the outlet 8. Accordingly, when the compartments a, b, c and d of the upper vessel 3 are filled with the substances, the compartments e, f, g and h of the vessel 4 and the compartments a, b, c and d of the lower vessel 5 are filled with the substances. Therefore, the weight of the substances passing through the outlet 8 during a given period of time can be calculated easily by measuring the number of revolutions of the top or bottom rotary disc 10 or 14 of the vessel 5 and also by continuously measuring the weight of the substances received in the vessels 4, 5 by means of the weighing means 6.

Figure 2:
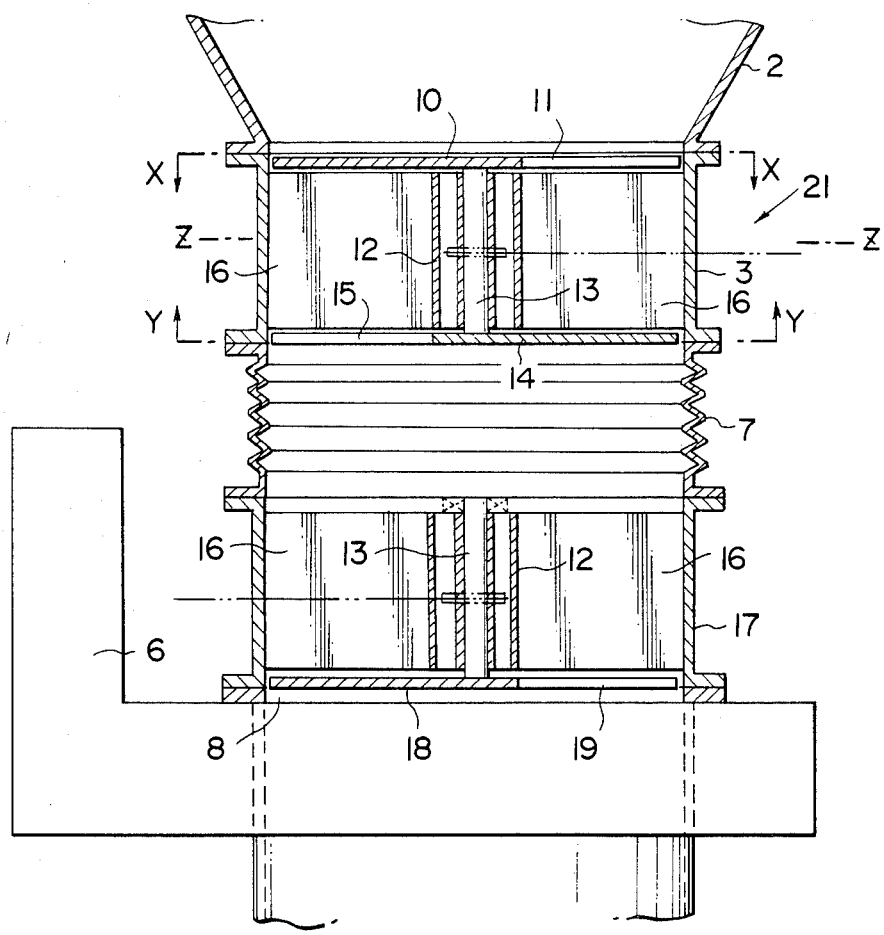
FIG. 2 is a view similar to FIG. 1 of a weighing apparatus according to the second embodiment of the present invention.
Figure 3:
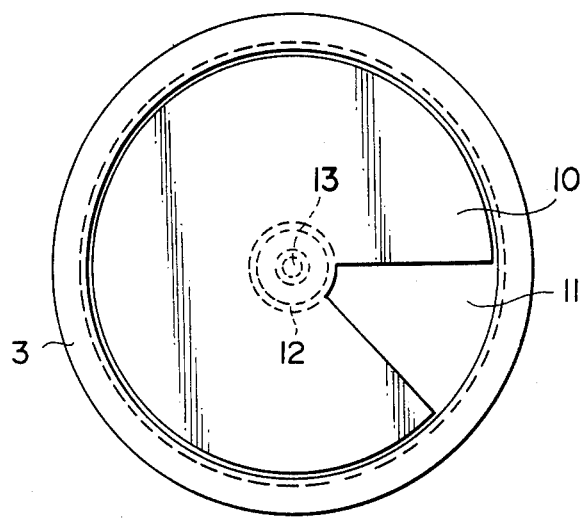
FIGS. 3, 4 and 5 are cross-sectional views taken along the lines X—X, Y—Y and Z—Z of FIGS. 1, 2, respectively.
Figure 4:
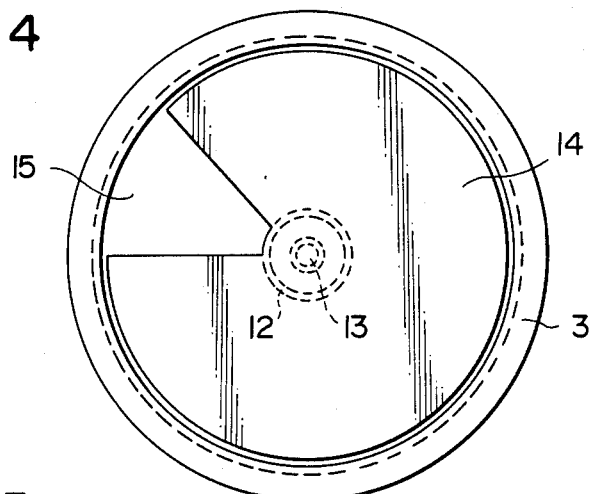

Referring now to FIG. 2, there is illustrated a weighing apparatus 21 according to the second embodiment of the present invention. The weighing apparatus 21 includes two cylindrical vessels 3 and 17 which are disposed vertically under a hopper 2 with the axes thereof being aligned with each other. The upper vessel 3 and the lower vessel 17 are substantially identical in shape and construction except that the vessel 17 is provided with no rotary disc at its top. The vessels 3 and 17 have the same diameter and each has eight compartments a, b, c, d, e, f, g and h of the same sectional area (see FIG. 5) formed in a fan shape in its interior by the partition walls 16 fixedly connected to the peripheral wall of the vessel. The corresponding partition walls 16 and thus the compartments of the two vessels are aligned with each other in the vertical direction. The heights of the vessels 3 and 17 may be different from each other. The upper vessel 3 is provided with rotary discs 10 and 14 at its top and bottom, respectively. The top and bottom discs 10 and 14 are formed with fan-shaped openings 11 and 15 therein, respectively, the area of which is substantially the same as the sectional area of one of the compartments. The openings 11 and 15 are staggered in position so as not to be positioned on the same compartment and preferably they are arranged symmetrically to the axis of the vessel.

The lower vessel 17 has no rotary disc at the top but has a rotary disc 18 at the bottom thereof. The rotary disc 18 is formed with a fan-shaped opening 19 of substantially the same area as the openings 11, 15. As illustrated in FIG. 2, the discs 10 and 18 are arranged so that the phases of the openings 11 and 19 coincide with each other. The discs 10, 14 and 18 of two vessels 3 and 17 are rigidly secured to rotary shafts 13 and 13. The discs 10, 14 and 18 are rotated at the same angular velocity through the shafts 13 and 13 by means of a mechanical or electrical synchronizing mechanism (not shown), while maintaining the openings 11 and 19 in phase with each other and the opening 15 shifted in phase from said phase preferably by an angle of 180 degrees about the axis of the vessel.

Under the lower vessel 17, there is provided a weighing means 6, e.g. a load cell or a platform weighing machine. The weighing means 6 is formed with an outlet 8 for discharging the powder or particle substances which flow out through the opening 19 of the lower vessel 17. The upper vessel 3 is directly secured to the lower end of the hopper 2 and a flexible hood 7 is provided between the upper vessel 3 and the lower vessel 17. Accordingly, the weighing means 6 can measure only the weights of the lower vessel 17 and the substances received therein and further can be designed to indicate only the weight of the substances received in the vessel 17 after deduction of the weight of the vessel 17.

The present weighing apparatus 21 constructed as described above operates as follows. First, the rotary shafts 13, 13 are driven by means of the synchronizing mechanism to rotate the top and bottom discs 10 and 14, 18 at the same time angular velocity. When the opening 11 of the upper vessel 3 is in alignment with a given compartment, e.g. the compartment a, the substances in the hopper 2 fall through the opening 11 into the compartment a. At this time, the opening 15 of the upper vessel 3 is in alignment with the compartment e of the lower vessel 17 and thus the substances previously received in the compartment e of the vessel 3 fall through the opening 15 into the corresponding compartment e of the vessel 17. Accordingly, when the top and bottom discs 10 and 14 of the upper disc 3 are rotated continuously in this manner, half of the eight compartments in the vessel 3 (for example, a, b, c and d) are filled with the substances, while in the vessel 17, the other compartments e, f, g and h are filled with the substances.

For example, when the substances are charged from the hopper 2 into the compartment a of the vessel 3, the substances previously received in the compartment e thereof flow through the opening 15 into the corresponding compartment e of the vessel 17. At the same time, the substances previously received in the compartment a of the vessel 17 are discharged through the opening 19 and the outlet 8. Accordingly, when the compartments a, b, c and d of the upper vessel 3 are full the compartments e, f, g and h of the lower vessel 17 are also full.

Therefore, the weight of the substances passing through the outlet 8 during a certain period of time can be easily calculated by measuring the number of revolutions of the bottom rotary disc 18 and also by continuously measuring the weight of the substances received in the vessel 17 by means of the weighing means 6.

As mentioned above, the weighing apparatus according to the present invention can directly and continuously weigh continuously fed powder or particle substances.

While the invention has been described with reference to preferred embodiments, it will be understood by those skilled in the art that various changes may be made without departing from the scope of the invention.

What is claimed is:

1. An apparatus for directly and continuously weighing continuously fed powder or particle substances comprising:
    (a) an upper vessel and a lower vessel disposed vertically under a hopper with the axes thereof being aligned with one another and having a plurality of compartments therein, the upper vessel being provided with rotary discs at the top and bottom portions thereof and the lower vessel being provided with a rotary disc at the bottom portion thereof,
    (b) a means for rotating said rotary discs at the same angular velocity,
    (c) a weighing means disposed under said lower vessel, and
    (d) an opening formed in each of said rotary discs corresponding in size to a compartment of said plural compartments, the opening formed in said top rotary disc of said upper vessel being shifted by 180° about the axis thereof from the opening formed in said bottom rotary disc of said upper vessel, wherein said rotary discs of said upper and lower vessels are rotated by said rotating means so that the openings formed in said top disc of the upper vessel and said bottom disc of the lower vessel coincide with each other.

2. An apparatus according to claim 1 wherein all of said openings have the same area.

* * * * *